April 21, 1931.  J. S. WEAR  1,802,295

FISHING LINE NONTWIST PLATE

Filed March 12, 1930

James S. Wear INVENTOR

BY Victor J. Evans ATTORNEY

Patented Apr. 21, 1931

1,802,295

UNITED STATES PATENT OFFICE

JAMES S. WEAR, OF DELTA, COLORADO

FISHING-LINE NONTWIST PLATE

Application filed March 12, 1930. Serial No. 435,211.

This invention relates to a device for use in connection with a fishing line equipped with a swiveled hook and bait unit, such for example as a spoon or fly. It is well known that where baiting devices of this character are employed, there is likelihood of the fishing line twisting and thus causing it to be unevenly rewound upon the reel and therefore the present invention has as its object to provide means for preventing such twisting of the fishing line.

Another object of the invention is to provide an extremely simple and inexpensive device which may be interposed between the swivel for the bait hook and spoon, and a fishing line, and which device will act somewhat in the manner of a rudder in order to prevent twisting of the fishing line, although the spoon may have free spinning or turning movement.

This invention also consists in certain other features of construction and in the combination and arrangement of the several parts to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:—

Figure 1:
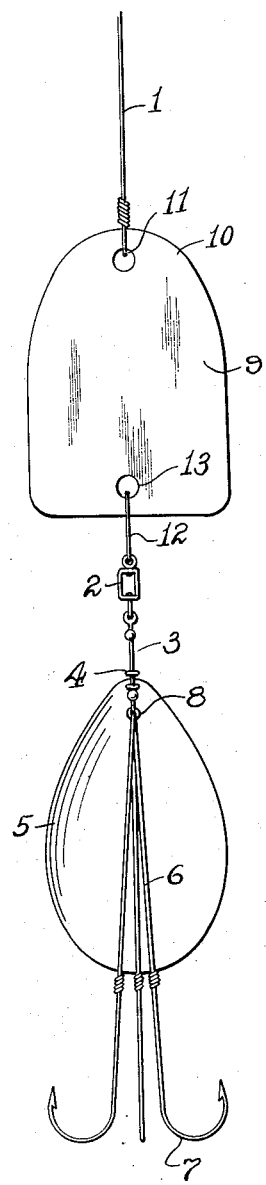
Figure 1 is a view in elevation looking at one side of the device, installed in connection with a fishing line and hooks and spoon.
Figure 2:
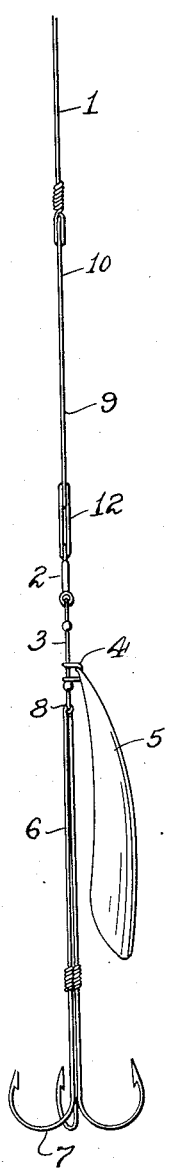
Figure 2 is a similar view looking at one side of the device.

In the drawing the numeral 1 indicates the ordinary fishing line and the numeral 2 indicates a swivel which may be of any of the ordinary types and which is connected to the forward end of shank 3 upon which shank there is swiveled the usual connector 4, to which the spoon, indicated by the numeral 5 is pivotally connected, the catgut leads 6 of the fishing hooks 7 being connected as at 8, to the other end of the said stem 3. The device embodying the invention comprises a flat sided plate 9 which may be of sheet metal or any other material found suitable for the purpose, and preferably this plate, at its forward end, has an arcuate marginal contour as indicated by the numeral 10, and an opening 11 is formed in this end of the plate, through which opening the end of the fishing line 1 is threaded, and the line then knotted. A loop 12 which may be of wire is engaged at one end in another opening 12 formed in the rear end portion of the plate 9, and this loop is connected to that member of the swivel 2 other than the member to which the stem 3 is connected.

From the foregoing description it will be evident that when the line has been cast and is drawn through the water, the plate 9 will cut through the water without rotating or spinning, and therefore it offers resistance to the line to rotate due to the rotation of the spoon and hooks, and consequently when the fishing line is rewound upon the reel, it will be wound evenly and without any tendency to kink as it is not subjected to any twisting strain.

What I claim is:—

An attachment for fishing lines comprising a comparatively wide and long plate, thin in thickness and having one end arcuately curved and the opposite end provided with substantially abrupt corners, said plate having an opening in each end located on the medial line.

In testimony whereof I affix my signature.
JAMES S. WEAR.